United States Patent [19]
Laarman

[11] 3,757,369
[45] Sept. 11, 1973

[54] PIPELINE WITH FLOATS
[75] Inventor: Johannes Bertus Laarman, Zwijndrecht, Netherlands
[73] Assignee: N.V. Industrieele Handelscombinatie, Holland, Rotterdam, Netherlands
[22] Filed: Jan. 17, 1972
[21] Appl. No.: 218,207

[30] Foreign Application Priority Data
Jan. 18, 1971   Netherlands........................ 7100651

[52] U.S. Cl. ...................................... 9/8 R, 114/52
[51] Int. Cl. .......................... B63c 7/08, B63b 21/52
[58] Field of Search.................... 9/8 R; 114/50, 52; 61/72.3

[56] References Cited
UNITED STATES PATENTS
2,783,027   2/1957   Gilbert............................... 9/8 R X
2,731,800   1/1956   Collins............................... 9/8 R X

FOREIGN PATENTS OR APPLICATIONS
128,713    7/1960   U.S.S.R................................ 61/72.3
1,257,039  2/1961   France................................. 61/72.3

Primary Examiner—Milton Buchler
Assistant Examiner—Gregory W. O'Connor
Attorney—Irvin S. Thomson et al.

[57] ABSTRACT

A pipeline is supported in the water by slender upright floats that are articulated to the pipeline. Each float carries a waterproof winch at its upper end that is connected by a cable to a point on the pipeline at least as far away from the associated float as the height of the associated float. When the winch is operated, the float is drawn down toward a horizontal position thereby to raise the pipeline.

6 Claims, 1 Drawing Figure

PATENTED SEP 11 1973
3,757,369
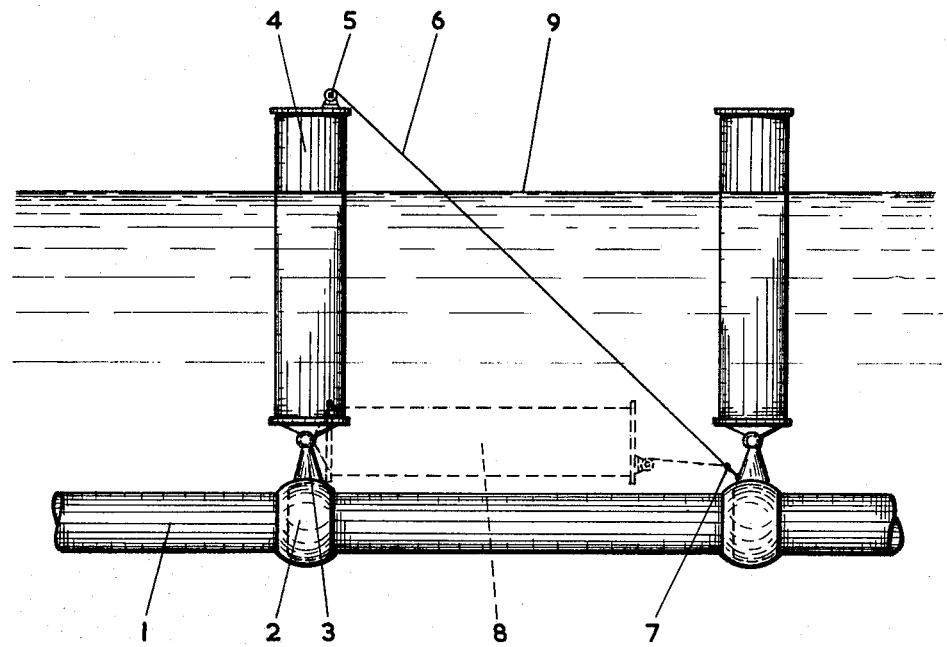

PIPELINE WITH FLOATS

The present invention relates to a pipeline with floats which are secured to the pipeline in a vertical position. The floats are of relatively small cross section and so the effects of swell on the pipeline are reduced. Such a pipeline is disclosed for example in Dutch Pat. application Ser. No. 67-12282, which has been laid open to public inspection.

It is occasionally necessary to repair or to perform other work operations on such pipelines. To do this, it is necessary to raise the pipeline, and this is a difficult task requiring complicated machinery.

Accordingly, it is an object of the present invention to eliminate the difficulties of raising pipelines, that were encountered heretofore.

Another object of the present invention is to provide a pipeline with floats which will be relatively simple and inexpensive to manufacture, assemble, emplace, maintain and repair, and rugged and durable in use.

Briefly, the objects of the invention are achieved in that each float is secured at one end to a pipeline by means of an articulated joint about which the float can swing relative to the pipeline at least about a horizontal axis perpendicular to the pipeline, and in that each float has means to move the float relative to the pipeline from an upright position to a horizontal position so that the buoyancy of the pipeline as a whole is increased and the pipeline can be brought to the surface of the water where it is accessible for work operations such as repair.

In greater detail, a plurality of floats is secured to the pipeline, each float being preferably a sealed length of pipeline. A watertight winch is mounted on each float, preferably on the upper end thereof, and a cable is wound about each winch and secured to the pipeline at a distance from the joint between the pipeline and the float which is at least as great as the height of the float. The winches can be simultaneously operated by remote control so as to draw in the cables whereby the floats are swung toward a horizontal position and the pipeline will rise from the water. The pipeline is preferably assembled in sections which are interconnected by joints such as ball joints with a float adjacent each joint.

These and other objects, features and advantages of the present invention will become apparent from a consideration of the following description, taken in connection with the accompanying drawing, which is a fragmentary elevational view, somewhat schematic in nature, of a length of pipeline according to the present invention, with one of the floats thereon shown in alternative positions in full and phantom lines.

Referring now to the drawing in greater detail, there is shown a pipeline 1 according to the present invention, comprising a plurality of sections that are connected to one another by ball joints 2. Each joint 2 carries an upstanding bracket 3 which is connected by a universal ball and socket joint to the lower end of an elongated float 4 which is a sealed section of pipeline. The free end of each float 4 is the upper end thereof as shown in full lines in the drawing, and on this upper end there is mounted a watertight winch 5 about which is wound a cable 6. The other end of cable 6 is secured by a connection 7 to the pipeline at a point remote from the pivotal connection of the associated float.

Only one of the floats is shown in the drawing as having the structure 5-7. However, it will of course be appreciated that the structure 5-7 is provided on each float, and that the winches 5 may be simultaneously operated by remote control means (not shown).

Upon operation of the winches 5, the cables 6 are wound thereon, so that the floats 4 are simultaneously drawn down from the upright position shown in full lines in the drawings, toward and perhaps to a horizontal position 8 shown in phantom lines in the drawing. The buoyancy of the pipeline as a whole is thus increased, and the pipeline rises toward the surface 9 of the water. This vertical swinging movement of the float 4 is made possible by the articulated joint between the bracket 3 and the float 4, which for this purpose permits the float 4 to swing about at least a horizontal axis perpendicular to pipeline 1, relative to pipeline 1.

It will also be noted that the distance between the bracket 3, and more particularly the point of articulation of float 4 on bracket 3, and the connection 7 is at least as great as and preferably greater than the height of the float 4, as best seen from a consideration of the phantom-line position 8 of the float 4 in the drawing.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A pipeline submerged in a body of water and having a plurality of vertically elongated upright floats thereon, said floats supporting the pipeline in said body of water and extending above the surface of the body of water, an articulated joint between the lower end of each float and the pipeline, and means for swinging each float about said joint to move the floats from an upright position downwardly toward a horizontal position and for holding the floats in the downwardly swung position.

2. A pipeline as claimed in claim 1, said means comprising a watertight winch mounted on each float and having a cable thereon secured to the pipeline at a distance from the joint of the float, whereby upon operation of the winch to shorten the cable, the float is drawn toward a horizontal position by vertical swinging movement of the float about said joint.

3. A pipeline as claimed in claim 2, said winch being mounted on the end of the float remote from said joint, said cable being secured to the pipeline at a distance from said joint which is at least as great as the length of the float.

4. A pipeline as claimed in claim 1, said joint articulating said float for vertical swinging movement of said float relative to said pipeline about a horizontal axis perpendicular to said pipeline.

5. A pipeline as claimed in claim 1, in the form of a plurality of sections articulately interconnected to each other at a plurality of spaced points, there being a said float at each of said points.

6. A pipeline as claimed in claim 1, said means comprising winch and cable means interconnecting a portion of the float remote from the associated joint and a portion of the pipeline remote from said associated joint whereby upon operation of the winch to shorten the cable, the float is drawn toward said horizontal position by vertical swinging movement of the float about said joint.

* * * * *

UNITED STATES PATENT OFFICE
CERTIFICATE OF CORRECTION

Patent No. 3,757,369      Dated September 11, 1973

Inventor(s) Johannes Bertus Laarman

It is certified that error appears in the above-identified patent and that said Letters Patent are hereby corrected as shown below:

The priority should be corrected as follows:

[30] Foreign Application Priority Data

Jan. 18, 1971     Netherlands         7100650

Signed and sealed this 23rd day of April 1974.

(SEAL)
Attest:

EDWARD M. FLETCHER, JR.
Attesting Officer

C. MARSHALL DANN
Commissioner of Patents